US007739200B2

(12) United States Patent
Gilham

(10) Patent No.: US 7,739,200 B2
(45) Date of Patent: Jun. 15, 2010

(54) METHOD OF ELECTRONICALLY CONSOLIDATING MAIL ITEMS

(75) Inventor: Dennis Gilham, Stock (GB)

(73) Assignee: NEOPOST Technologies, Bagneux (FR)

( * ) Notice: Subject to any disclaimer, the term of this patent is extended or adjusted under 35 U.S.C. 154(b) by 732 days.

(21) Appl. No.: 11/233,485

(22) Filed: Sep. 22, 2005

(65) Prior Publication Data

US 2006/0136346 A1 Jun. 22, 2006

(30) Foreign Application Priority Data

Sep. 23, 2004 (FR) .................................. 04 10050

(51) Int. Cl.
*G06Q 10/00* (2006.01)
(52) U.S. Cl. ...................... 705/332; 705/336; 705/330; 705/402
(58) Field of Classification Search ................ 705/1
See application file for complete search history.

(56) References Cited

U.S. PATENT DOCUMENTS

| 5,051,914 | A | * | 9/1991 | Sansone et al. ............. 700/223 |
| 5,072,401 | A | | 12/1991 | Sansone et al. ............. 364/478 |
| 5,377,120 | A | * | 12/1994 | Humes et al. ............... 700/224 |
| 6,385,504 | B1 | * | 5/2002 | Pintsov et al. .............. 700/226 |
| 6,549,892 | B1 | * | 4/2003 | Sansone ..................... 705/401 |
| 6,983,194 | B1 | * | 1/2006 | Stadermann ............... 700/213 |
| 7,049,963 | B2 | * | 5/2006 | Waterhouse et al. ..... 340/572.1 |
| 7,191,142 | B1 | * | 3/2007 | Sandell et al. ................. 705/9 |
| 2002/0053533 | A1 | * | 5/2002 | Brehm et al. ................ 209/3.1 |
| 2002/0077847 | A1 | * | 6/2002 | Thiel ............................. 705/1 |
| 2004/0064326 | A1 | * | 4/2004 | Vaghi ............................ 705/1 |
| 2004/0215480 | A1 | * | 10/2004 | Kadaba ......................... 705/1 |
| 2005/0289040 | A1 | * | 12/2005 | Lecker et al. ................ 705/37 |
| 2006/0095391 | A1 | * | 5/2006 | Cordery et al. ............. 705/402 |

FOREIGN PATENT DOCUMENTS

| EP | 0 911 754 A2 | 3/1993 |
| EP | 1 058 212 A2 | 5/2000 |
| EP | 1 431 929 A2 | 12/2003 |
| FR | 2 592 504 | 7/1987 |

OTHER PUBLICATIONS

"RFID potential demonstrated"; Material Handling Management, v. 59, n. 2, p. 12(2); Feb. 2004.*
Grunman, Galen; "UPS Versus FedEx", CIO v17n16, pp. 66-71; Jun. 1, 2004.*

* cited by examiner

*Primary Examiner*—John W Hayes
*Assistant Examiner*—Kevin Flynn
(74) *Attorney, Agent, or Firm*—Sughrue Mion, PLLC

(57) ABSTRACT

A method of electronically consolidating mail items between a plurality of senders and a postal administration, including consolidating files received from senders into a single consolidation file; each file containing a unique identity code and an address of a destination of each mail item; sending a collection order to a mail item collection service so that a collection employee collects the mail items to be sent from the various senders, each mail item being affixed with the unique identity code for the purpose of identifying both the sender and the mail item; receiving, via a wireless telecommunications network, said unique identity code borne by each mail item; taking delivery of the mail items and printing a bar code onto each of them; and sending the single consolidation file to a server of the postal administration and handing over the mail items to a collection office of the postal administration.

9 Claims, 2 Drawing Sheets

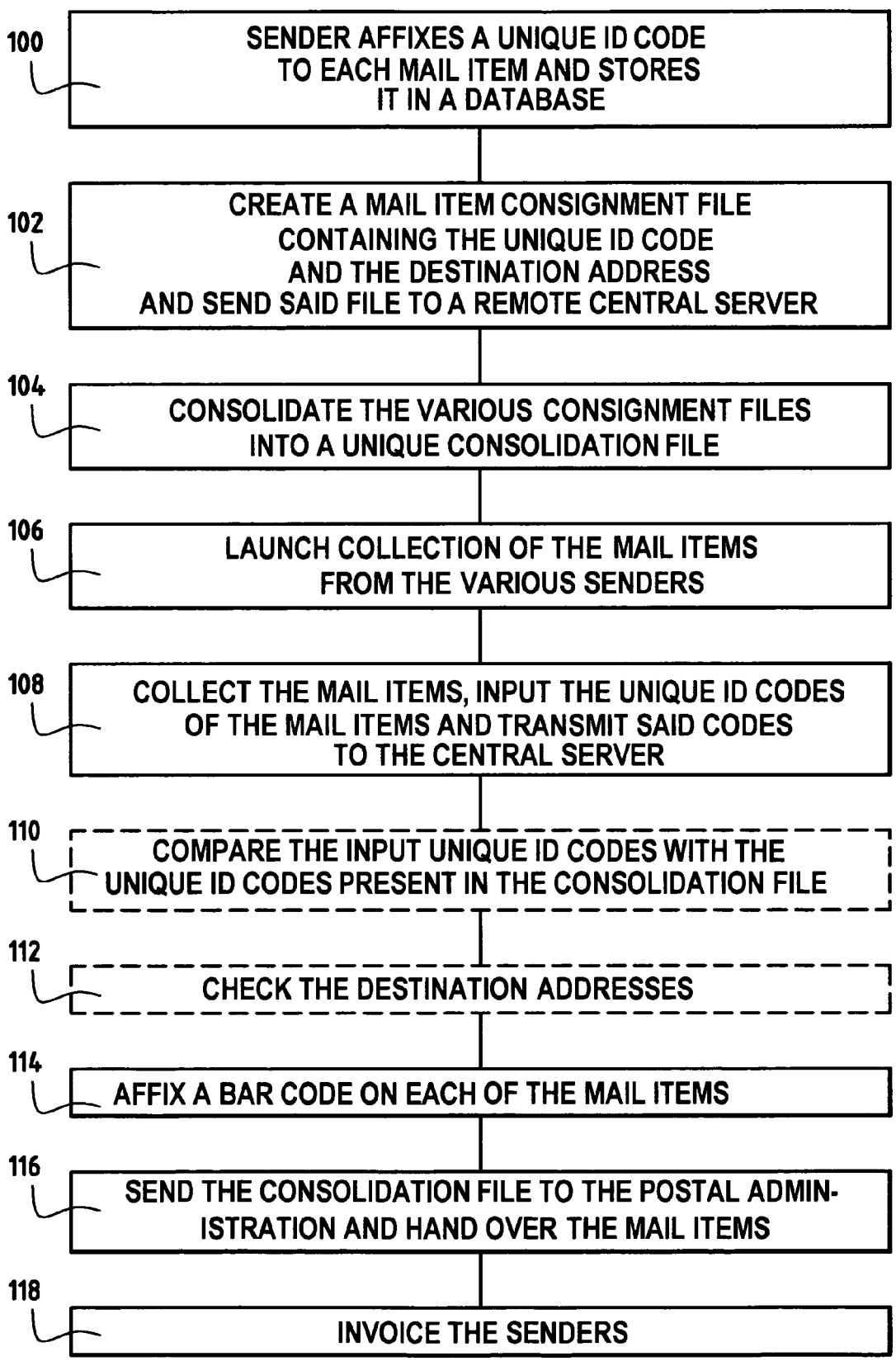

METHOD OF ELECTRONICALLY CONSOLIDATING MAIL ITEMS

CROSS-REFERENCE TO RELATED APPLICATIONS

This application claims priority from French Patent Application No. 04 10050, filed on Sep. 23, 2004.

TECHNICAL FIELD

The present invention relates to the field of mail handling and relates more particularly to a method of automatically sending mail items from a multitude of senders to a single destination.

PRIOR ART

Nowadays, in every country, affixing postage amounts or "franking" is regulated, and postage amounts are set by the postal administrations as a function of pre-established and particularly detailed lists of prices. However, the postal administrations generally grant discounts on their prices when the sender performs operations that are generally the responsibility of the postal administration. That applies, in particular, to routers who handle thousands of mail items per day and pre-sort them, e.g. by affixing a bar code on each of them.

SUMMARY OF THE INVENTION

An object of the present invention is to enable individual senders also to enjoy discounts on the usual prices payable by them in spite of them not satisfying the conditions required for such discounts to be applied. An object of the invention is thus to propose a method that is independent of the number of mail items sent by the sender via the postal administration, and that enables said sender to enjoy advantageous price conditions.

These objects are achieved by a method of electronically consolidating mail items between a plurality of senders and a postal administration that handles delivery of said mail items to their destinations, said method comprising the following steps:

at the premises of each of the senders:
  using print means to affix a unique identity code (ID CODE) to each mail item for the purpose of identifying both the sender and the mail item; and
  using a computer to create a mail item consignment file in a database, which file contains, for each mail item, said unique identity code and the address of the destination of said mail item, and sending said file via a network to a remote central server of a third party entity; and
at the central server of the third party entity:
  consolidating the files received from all of the senders into a single consolidation file in a central database;
  sending a collection order to a mail item collection service so that a collection employee collects the mail items to be sent from the various senders, the collection step also including an input step for inputting said unique identity code borne by each mail item at input means and a transmission step for transmitting said code to said remote central server from said input means, via a wireless telecommunications network;
  taking delivery of the mail items after the collection and using print means for printing a bar code (BC) onto each of them for the purpose of facilitating subsequent sorting of them by the postal administration; and
  sending said single consolidation file to a server of the postal administration and handing over the mail items to a collection office of the postal administration.

Thus the postal administration receives the mail items directly form the third party entity rather than from the initial senders, and the consolidation file that accompanies said mail items makes it possible, depending on its contents, for said entity to enjoy substantial discounts that can be redistributed by the third party entity to the initial senders.

The consolidation step for consolidating the files received from all of the senders is started at the latest at a predetermined limit time.

Preferably, said unique identity codes input at the input means by said collection employee are compared, at said central server, with the unique identity codes that are present in said consolidation file.

Advantageously, at the central server, provision is made for a step of checking said destination addresses on the basis of said central database which contains a list of valid addresses.

In a preferred embodiment, a step of invoicing the senders is performed while taking account of the individual discounts linked to the bulk handling of the mail that is thus brought to the postal administration.

Said unique identity code is a succession of alphanumeric characters, preferably of the optical character recognition (OCR) type, or a bar code that is one-dimensional or two dimensional. However, said unique identity code may also be written in a radio-frequency identity (RFID) tag stuck to the mail item.

BRIEF DESCRIPTION OF THE DRAWINGS

Other characteristics and advantages of the present invention appear more clearly from the following description given by way of non-limiting indication, and with reference to the accompanying drawings, in which:

FIG. 2 is a flow chart showing the various steps of the method of the invention.

DETAILED DESCRIPTION OF A PREFERRED IMPLEMENTATION

Figure 1:
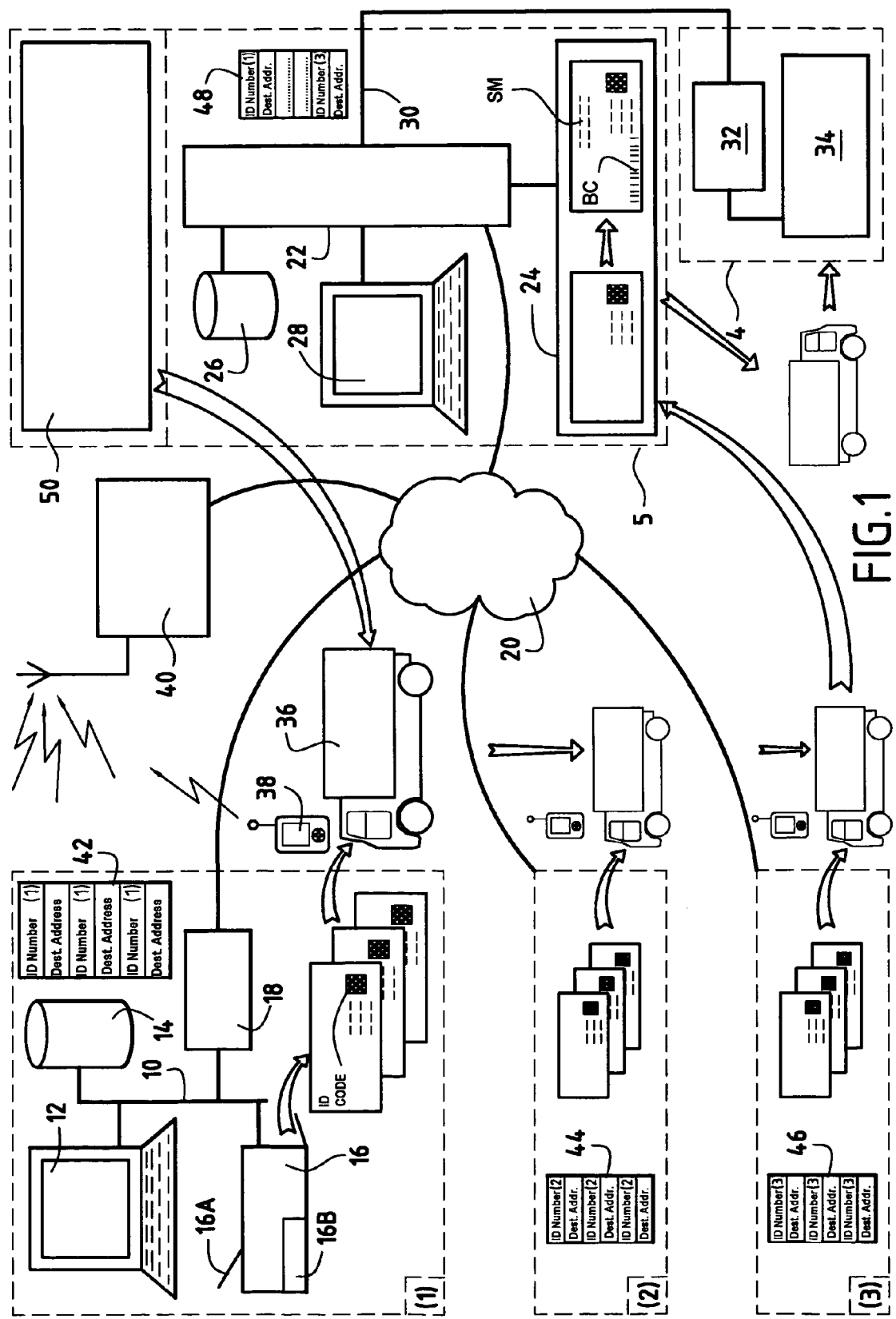
FIG. 1 shows an example of architecture of a logistics system for carrying and monitoring mail items that makes it possible to implement the method of the invention.

FIG. 1 diagrammatically shows architecture for a logistics system for carrying and monitoring mail items between a plurality of individual senders (e.g. 1, 2, and 3) and the postal administration 4 which receives said mail items in order to carry them to their destinations. The term "mail item" is used to mean any object on which a postal mark can be affixed either directly or via a label stuck to said item.

In the invention, the mail items are carried/monitored via a third party entity 5 that acts as an interface between the various senders and the postal administration, and, relative to said postal administration, behaves as a router, i.e. a large customer capable of delivering several thousands of mail items to the postal administration per day. The third party entity is the sole contact for the postal administration who thus has no direct relations with the senders. Due to the large quantity of mail handled, the third party can take advantage of preferential postal prices and thus of large discounts relative to the standard prices applicable to an individual sender, and can share the benefit of these discounts with each of the senders who have gone via said third party for delivering their mail to the postal administration.

As shown, a first sender 1, e.g. a sole trader or a small business, has a computer system organized around a local network 10 to which, and without this list being limiting, the following are connected: one or more computer terminals, e.g. of the personal computer 12 type, one or more databases 14, a mail handling module 16 for inserting mail items to be sent into envelopes and for affixing postage amounts to them, and a modem/router 18 for accessing the Internet 20.

The module 16 conventionally comprises a tray 16A for receiving empty envelopes, a tray 16B for storing blank documents that are to be printed, a folding module for inserting the documents into the envelopes, and a secure print module for printing the documents, the envelopes, and the postal marks that are to be affixed to the envelopes. Preferably, the documents are printed out from one of the computers 12 by the sender of the mail item, by being transferred electronically to the module 16 via the local network 10, so that they can then be inserted into envelopes prior to affixing postage amounts to the envelopes. However, the presence of the mail handling module is not essential to implementation of the method of the invention, it being possible for the document to be inserted into an envelope manually and for the postage amount to be affixed manually to the envelope (as applies to sending parcels, for example). Similarly, before the document is inserted into the envelope, the empty envelope and the document (or a label when sending parcels) can be printed by the sender at a printer (not shown) connected directly to the computer 12.

Each of the individual senders 2 and 3 has a similar configuration that does not need to be described in detail and that is also connected to the Internet 20.

At the third party entity, the logistics system also includes a central computer server 22 that manages a sorting unit 24 capable of pre-sorting mail items on the basis of various particular criteria determined by the postal administration, in particular a geographic criterion, and of affixing various codes to said mail items as is known, the codes making it possible for the postal administration to monitor said mail items and to handle them. The server 22 is associated with a database 26 and with one or more computer terminals 28, and it is connected firstly to the Internet 20, and secondly, preferably via a dedicated line 30, to a server of the postal administration 32 managing, in particular, the mail item sorting system 34.

In order to carry the mail items from the various senders to the third party entity and then to the postal administration, use is made of a carrier service that can optionally be independent of the third party entity. With said service, each driver (or collection employee) of a vehicle 36 for collecting the mail items is advantageously equipped with portable input and automatic transmission means 38 of the communicating laptop computer type, of the communicating personal assistant type, or of the mobile telephone type, which means can be connected to the central server 22 of the entity via a base station 40 of a wireless telecommunications network connected to said server via the Internet 20. Depending on the type (alphanumeric characters or bar code) of the unique identity code, said portable means can comprise a bar code reader/recognizer or an OCR digitizer, or indeed digital recording means, of the digital photo type, for reading said code and for converting it, using associated software means, into a determined format enabling it to be processed at the central server used to receive it.

The method implemented in the above-mentioned logistics system is explained below with reference to the flow chart in FIG. 2.

The first step 100 of the method is implemented at each of the senders, and it consists in providing a unique identity code ID CODE which identifies both the sender and the mail item.

The unique identity code can be in the form of alphanumeric characters, preferably of the OCR type, or, advantageously, in the form of a bar code (one-dimensional or preferably two-dimensional) printed in or very close to the destination address. This printing is performed in a manner known per se by the mail handling module 16. In the absence of said module, printing can naturally also be performed by a conventional printer equipped with suitable software means.

The unique identity code can also contain other information that is optional and that offers particular advantages for the sender, such as the date of sending, the postal service used, the reference of the document inserted into the mail item, etc. In parallel with printing of the unique identity codes on each of the mail items, all of the information associated with said codes is stored in the database 14 of the sender.

In a further step 102, the database is used to create a mail item consignment file 42, 44, 46. For each mail item, the file contains the unique identity code, the address of the destination of said mail item, and said file is sent to the remote central server 22 of the third party entity.

The next step 104 is implemented at the third party entity, and it consists in electronically combining or consolidating the various files received from all of the senders into a single consolidation file 48 for preparing the consignment for sending to the postal administration. The time at which the files are received can differ from one sender to another, in particular since, preferably, the sender should be able to add to its consignment at any time. However, a time limit (or more precisely a limit time) is advantageously set for receiving files from the senders, at which limit time compilation of the consolidation file is started.

In a step 106, a collection order is sent to a collection service 50 for collecting the mail items, which service is internal to or external to the third party entity, so that one or more collection employees collect, in a step 108, the mail items from the various senders and carry them to the third party entity for handling prior to them being carried to their destinations via the postal administration, said collection preferably being accompanied by inputting the unique identity code ID CODE borne by each mail item, and by transmitting it to the central server 22 via the wireless telecommunications network.

Thus, in an optional step 110, it is then possible, at the central server, for the identity codes of the mail items that are input directly by the collection employee to be compared with the identity codes received from the various senders and present in the consolidation file 48, and thus, if necessary, for the sender to be informed of any omission or error. Mention should be made of the also optional processing of step 112 which consists in checking the destination addresses (in particular the postal codes or "ZIP codes" that are in widespread use for automatic sorting) on the basis of the database 26 which contains a list of valid addresses.

Once collection is finished, the collection employee(s) carry the mail items to the third party entity who takes delivery of them for handling them and, in particular, in a further step 114, for printing a bar code BC on each of the mail items with a view to facilitating subsequent recognition by the postal administration of the destinations of the mail items. Various service messages SMs can also be affixed to the mail items for enabling them to be monitored. Once this handling is finished, the consolidated file, which has optionally been supplemented with the above-mentioned messages, is sent, in a step 116, to the server of the postal administration, and the mail items are handed over in parallel to a collection office of the postal administration. In a final step 118, the senders can be invoiced while taking account of the individual discounts related to the bulk handling of the mail handed over in this way to the postal administration.

During its own process of handling the mail and of carrying it to the destination, the postal administration gives or makes available to the third party entity, as is known, the information necessary for monitoring the mail items that have been handed over, and said third party entity can make said information available to the senders, e.g. on the central server 22 which is accessible via the Internet.

It should also be noted that, although the present invention is described with reference to a particular architecture, it is not limited to this architecture alone, and it is entirely possible for the unique identity code to be recorded in an RFID tag stuck to the mail item to be sent, the automatic input means available to the collection employee then advantageously being formed by RFID read means that can extract the unique identity code from said tag for transmission to the central server. Similarly, although, as described, the postage amounts are affixed to the mail items by the sender, it can be preferable for them to be affixed to the mail items by the third party entity.

Likewise, although the method of the invention is described with reference to the postal administration, it is entirely possible for said postal administration to be replaced with one or more private carriers, for the central server to choose the most suitable carrier (in practice, the least costly carrier or the carrier offering the best quality of service), as a function of the destinations of the various mail items, and for said central server to send the consolidation file to each selected carrier rather than to the postal administration, said file then being put in the format desired by said carrier.

What is claimed is:

1. A method of electronically consolidating mail items between a plurality of senders and a postal administration that handles delivery of said mail items to their destinations, said method comprising:
    consolidating files received from the plurality of the senders into a single consolidation file in a central database associated with a remote central server of a third party entity; wherein each file contains, for each mail item, a unique identity code and an address of a destination of said mail item;
    sending a collection order to a mail item collection service so that a collection employee collects the mail items to be sent from the plurality of senders, each mail item being affixed with the unique identity code for the purpose of identifying both the sender and the mail item,
    during collecting of the mail items from the plurality of senders, inputting said unique identity code borne by each mail item at a portable input and transmission means and transmitting said unique identity code to said remote central server from said portable input and transmission means, via a wireless telecommunications network;
    comparing said unique identity codes received at said remote central server with the unique identity codes that are present in said consolidation file;
    informing a sender of the plurality of senders of any omitted mail item or error in the consolidation file based on the comparing of the unique identity codes;
    once collection is finished, taking delivery of the mail items and, at said third party entity, printing a bar code onto each of the mail items for the purpose of facilitating subsequent sorting of the mail items by the postal administration; and
    after informing the sender of the any omitted item or errors, sending said single consolidation file to a server of the postal administration and handing over the mail items to a collection office of the postal administration.

2. A method according to claim 1, wherein the consolidating the files received from all of the senders is started at a predetermined time.

3. A method according to claim 1, further comprising, at the central server, checking said destination addresses on the basis of a central database which contains a list of valid addresses.

4. A method according to claim 1, further comprising a step of invoicing the senders while taking account of the individual discounts linked to the bulk handling of the mail that is thus brought to the postal administration.

5. A method according to claim 1, wherein said unique identity code is a succession of alphanumeric characters or a bar code that is one-dimensional or two dimensional.

6. A method according to claim 1, wherein said unique identity code is written in an RFID tag stuck to the mail item.

7. A logistics system for carrying and monitoring mail items between a plurality of senders and a postal administration that handles delivery of the mail items to their destinations, said method comprising the following organized around a network:
    a plurality of computers, each of which is associated with a determined sender for creating, in a database, a mail item consignment file that, for each mail item to be sent, contains firstly a unique identity code that identifies both the sender and the mail item, and secondly the destination address;
    a remote central server of a third party entity for receiving said mail item consignment files from said plurality of computers and via said network, for consolidating the received files into a single consolidation file, for sending a collection order to a collection service for having the mail items collected from each of the senders, for using print means to print at least one bar code on each of the mail items once delivery has been taken of said mail items, for sending said unique consolidation file to a server of the postal administration and for sending a hand-over order for handing over the mail items to a collection office of the postal administration, and for receiving, via the network, said unique identity code borne by each mail item from the mail item collection service; and
    a portable input and transmission means that transmits said unique identity code borne by each mail item to said remote central server via a wireless telecommunications network;
    wherein the central server compares said unique identity codes received at said central server with the unique identity codes that are present in said consolidation file, and informs a sender of the plurality of senders of any omitted mail item or error in the consolidation file based a comparison of the unique identity codes before a collection employee delivers the mail items to said third party entity.

8. A logistics system for carrying and monitoring mail items according to claim 7, further comprising input means for reading said single identity code borne by each mail item and for transmitting it to said central server via a wireless telecommunications network.

9. A method according to claim 5, wherein the unique identity code is the succession of alphanumeric characters and is of the OCR type.

* * * * *